United States Patent [19]

Daniels et al.

[11] 4,156,329
[45] May 29, 1979

[54] METHOD FOR FABRICATING A ROTARY DRILL BIT AND COMPOSITE COMPACT CUTTERS THEREFOR

[75] Inventors: William H. Daniels, Delaware; Friedel S. Knemeyer, Columbus, both of Ohio

[73] Assignee: General Electric Company, Worthington, Ohio

[21] Appl. No.: 796,635

[22] Filed: May 13, 1977

[51] Int. Cl.² .......................... E21B 9/36; B23K 1/20
[52] U.S. Cl. ........................................ 51/295; 51/309; 175/329; 175/330
[58] Field of Search .................. 51/295, 309; 175/330, 175/375, 329

[56] References Cited

U.S. PATENT DOCUMENTS

| | | | |
|---|---|---|---|
| 2,906,612 | 9/1959 | Anthony et al. | 51/309 |
| 3,136,615 | 6/1964 | Bovenkerk et al. | 51/307 |
| 3,233,988 | 2/1966 | Wentorf, Jr. et al. | 51/307 |
| 3,461,983 | 8/1969 | Hudson et al. | 51/309 |
| 3,596,649 | 8/1971 | Olivieri | 51/309 |
| 3,609,818 | 10/1971 | Wentorf, Jr. | 51/307 |
| 3,743,489 | 7/1973 | Wentorf, Jr. et al. | 51/307 |
| 3,745,623 | 7/1973 | Wentorf et al. | 51/309 |
| 3,757,879 | 9/1973 | Wilder et al. | 175/329 |
| 3,767,371 | 1/1973 | Wentorf et al. | 51/307 |
| 3,913,280 | 10/1975 | Hall | 51/309 |
| 3,982,911 | 9/1976 | Lee | 51/309 |
| 4,006,788 | 2/1977 | Garner | 175/330 |
| 4,098,362 | 8/1978 | Bonnice | 175/329 |
| 4,109,737 | 8/1978 | Bovenkerk | 175/329 |

OTHER PUBLICATIONS

Brazing Manual, American Welding Society, 1963, p. 108.

Primary Examiner—Donald J. Arnold
Attorney, Agent, or Firm—Morgan, Finnegan, Pine, Foley & Lee

[57] ABSTRACT

A method for fabricating a drill bit comprising a plurality of composite compact cutters by furnace brazing each cutter in a recess in the crown of the drill bit. In one embodiment, each cutter is comprised of a mass of bonded polycrystalline abrasive, a substrate bonded to said abrasive mass and a thin layer of brazing filler metal coating the exposed surface of the substrate. In another embodiment, the cutter comprises a composite compact cutter blank bonded to one end of a cemented carbide pin, and a thin layer of brazing filler material coating the substrate of the blank and the carbide pin. In both embodiments, the coating of brazing filler metal is applied to the cutters by dipping in a molten bath of the filler metal.

55 Claims, 6 Drawing Figures

METHOD FOR FABRICATING A ROTARY DRILL BIT AND COMPOSITE COMPACT CUTTERS THEREFOR

CROSS REFERENCE TO RELATED APPLICATIONS

U.S. patent application Ser. No. 699,411 filed June 24, 1976 now U.S. Pat. No. 4,109,737 and assigned to the assignee of the invention herein is directed to a rotary drill bit comprising a plurality of cutting elements, each of which is comprised of an elongated pin with a thin layer of diamond bonded to the exposed end of the pin. The pin is mounted by press fitting into the drill crown.

U.S. patent application Ser. No. 746,044 filed November 30, 1976 now U.S. Pat. No. 4,098,362 and assigned to the assignee of the invention herein is directed to a rotary drill bit comprising a plurality of diamond compact cutters. The diamond compact cutters are mounted in a drill crown by molding or by attachment to a cemented carbide pin which is in turn mounted in a drill crown by pressed fitting. Brazing is also disclosed as an alternate technique for mounting such compact cutters in the drill crown.

BACKGROUND OF THE INVENTION

This invention relates to implements with abrasive compacts and more particularly to techniques for fabricating such cutters from such compacts and for fabricating drill bits of such cutters.

A cluster compact is defined as a cluster of abrasive particles bonded together either (1) in a self-bonded relationship, (2) a means of a bonding medium disposed between the crystals, (3) by means of some combination of (1) and (2). Reference can be made to U.S. Pat. No. 3,136,615, U.S. Pat. No. 3,233,988 and U.S. Pat. No. 3,609,818 for a detailed disclosure of certain types of compacts and methods for making same. (The disclosures of these patents are hereby incorporated by reference herein.)

A composite compact is defined as a cluster compact bonded to a substrate material such as cemented tungsten carbide. A bond to the substrate can be formed either during or subsequent to the formation of the cluster compact. Reference can be made to U.S. Pat. No. 3,743,489, U.S. Pat. No. 3,745,623 and U.S. Pat. No. 3,767,371 for a detailed disclosure of certain types of composite compacts and methods for making same. (The disclosures of these patents are hereby incorporated by reference herein.)

Brazing is defined as a group of welding processes wherein coalescence is produced by heating to suitable temperatures above 800° F. and by using a filler metal having a melting point below that of the base metals. The filler metal is distributed between the closely fitted surfaces of the joint by capillary action.

A brazing filler metal is defined as a metal or alloy to be added when making a braze and having melting temperatures above 800° F. (but below those of the metals being joined).

Conventional rotary drill bits for oil and gas well drilling core drilling have heretofore used cutting elements such as (1) steel teeth, (2) steel teeth laminated with tungsten carbide, (3) a compact insert of cemented tungsten carbide and (4) natural diamonds all of which are set or molded in a tungsten carbide crown or cone. Due to the relatively short life and/or high operating cost of these conventional designs, it has recently been proposed to use synthetic diamond compacts as the cutting element in such drills.

In one prior art design, a drill bit cutting element is formed by attaching a diamond composite compact with a cemented carbide substrate by brazing the carbide substrate to a cemented carbide pin. The pin is mounted in a hole in the drill crown. The diamond layer is generally oriented in a radial sense to the center of rotation of the drill bit and penetrates the rock essentially as a cutting tool in a similar manner to a cutting tool which is used to cut metal on a lathe.

In a second prior art design, a cutting element is formed by furnace brazing a diamond composite compact in a recess of the crown of the drill bit. A portion of the compact is extended beyond the outer surface of the crown and forms a cutting edge for the drill.

One problem which has been encountered in field tests of the second design is that the stresses on each cutting element is severe and some disattachment of the cutters has been encountered. The stresses are caused because the structure of most rocks is heterogeneous and thus have layers of varying hardness. These layers cause a large variation in the impact loads to be applied to the cutting elements during drilling, and thus, the bond strength of such designs is not always strong enough to withstand such a widely varying impact loading.

Available attachment techniques and acceptable brazing filler metals for use with a diamond composite compact made in accordance with the teaching of U.S. Pat. No. 3,745,623 are limited because the diamond layer of such compacts is thermally degraded at temperatures above approximately 700° C. Similarly, it has been found that a cubic boron nitride (CBN) composite compact made in accordance with the teaching of U.S. Pat. No. 3,767,371 and U.S. Pat. No. 3,743,489 is also thermally degraded at temperatures above approximately 700° C. Thus, such compacts have been restricted from use in applications thought heretofore to require (1) the bonding of the compact to a support by a brazed material with a melting point close to or above the thermal degradation point of the compact or (2) the molding of the compact in an abrasion resistant matrix requiring high formation temperatures (e.g., cemented tungsten carbide) such as is commonly used in a surface-set rock drill crown.

Because of the thermal degradation problem, it has been necessary to use brazing filler metals with a liquidus below 700° C. Such metals formed braze joints generally of lower strength than braze filler metals having a higher liquidus. Even when the lower temperature liquidus metals (such as BAg-1-ASW-ASTM classification) are used, temperatures approaching those at which the diamond layer is degraded are required; hence, great care is required to prevent degradation of the compact during brazing.

One brazing process which has been used with some success with the second prior art design is comprised of the following steps: (1) positioning a plurality of diamond composite compact cutters, respectively, in a plurality of recesses in a preformed, high temperature drill crown matrix (e.g., of tungsten carbide), weighing between about 90 to 136 kg., with a wire or powder of the braze filler metal in the bottom of the recesses between the surfaces to be joined, (2) placing the drill crown with the cutters clamped in position in a furnace, (3) heating the furnace and its content of "heat-up" cycle of approximately 8 hours to bring the furnace and its contents to a temperature between 690° and 700° C., (4) maintaining this temperature for a "soak" cycle of approximately 1 hour and (5) removing the bit from the furnace and allowing it to cool.

The long heat-up cycle is required to permit good heat distribution thereby promoting the formation of a strong bond and to allow the brazing temperature to be approached slowly so that the degradation temperature of the compact is not exceeded. However, heat-up cycles of such length with low temperature liquidus brazing filler metals are disadvantageous because they contain volatile components, such as cadmium and zinc, which give the metal its low liquidus temperature. Cadmium and zinc are volatilized from such metal as a function of time at temperatures over 350° C. With the volatilization of these components the liquidus of the alloy is increased resulting in the poor wetting and weak bonding between the surfaces to be joined.

Accordingly, it is an object of this invention to provide a method for fabricating a drill bit providing improved bonding between the drill crown and a composite compact cutter.

Another object of this invention is to provide a fabrication technique permitting the use of a high formation temperature drill crown matrix.

Another object of this invention is to provide a drill bit fabrication method, which permits a shorter furnace brazing cycle to be used thereby reducing degradation of the filler metal and a risk of degradation to the composite compact.

Another object of the invention is to provide an improved composite compact which can be more easily brazed with increased bond strength to a tool or implement.

SUMMARY OF THE INVENTION

These and other objects of the invention are accomplished in one embodiment by a method for fabricating a drill bit comprising steps of (1) providing a plurality of composite compact cutters, (2) providing a drill bit comprising a drill crown with a plurality of recesses each for receiving a cutter, (3) positioning the cutters in the recesses and (4) bonding the cutters in the recesses. In one embodiment, each cutter has a thin continuous layer of brazing filler metal coated on the exposed surfaces of the substrate which provides the filler metal to form a direct bond between the crown recess and the cutter. In a second embodiment, each cutter is comprised of a composite compact cutter blank bonded on one end of a cemented carbide pin. A thin layer of brazing filler metal is coated on the exposed surfaces of the substrate of the blank and on the surface of the pin. These layers provide the filler metal to bond the blank to the pin and to bond the pin in a recess of the drill crown. In both embodiments, the coating of brazing filler material is applied to the cutters by dipping in a molten bath of the filler metal.

DESCRIPTION OF THE PREFERRED EMBODIMENTS

In accordance with one embodiment of this invention, a method is provided for fabricating a drill bit of any of a variety of types such as full hole oil and gas bits, coring bits and pilot bits.

In accordance with the method for fabricating such bits a plurality of composite compact cutters are positioned respectively in a plurality of recesses of the crown of a drill bit matrix. The bit with the cutters disposed in the recesses is then placed in a suitable fixture for clamping the cutters tightly in the recesses. The cutters are then bonded in the recesses by disposing the fixtured bit in a brazing furnace.

Figure 1A:
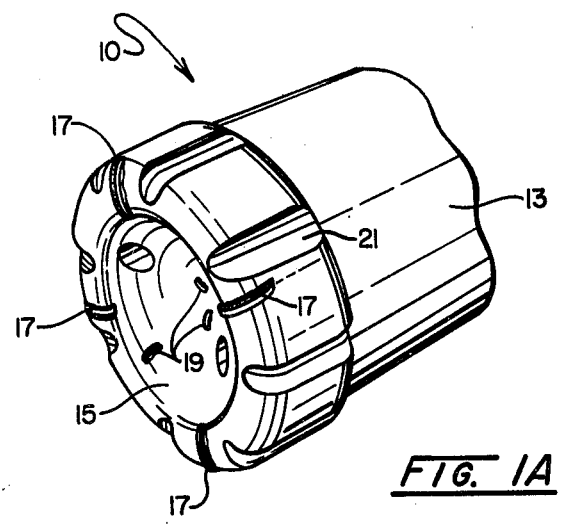
FIGS. 1A and 1B are fragmentary, perspective and plan views respectively of a pilot drill bit fabricated in accordance with one embodiment of this invention.
Figure 1B:
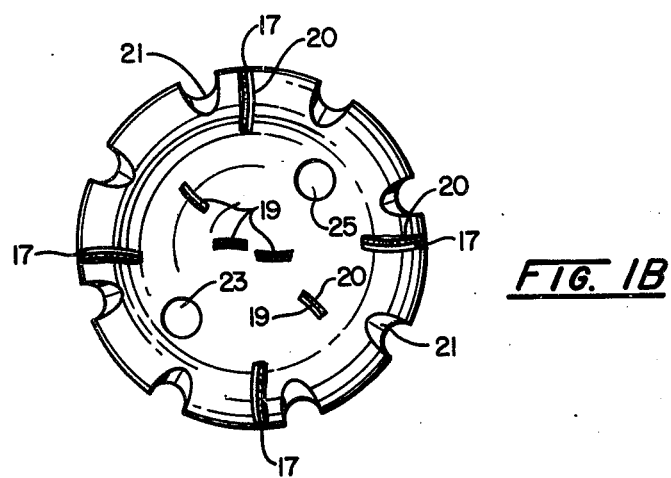

By way of example, a pilot bit 10 shown in FIGS. 1A and 1B illustrates a bit which can be constructed by this method. Bit 10 is comprised of an elongated, threaded shaft 13 and a drill crown 15, e.g., of tungsten carbide, in which a plurality of peripheral composite compact cutters 17 and of central composite compact cutters 19 are mounted respectively in recesses 20. A plurality of waterways 21 are formed in the drill crown 13 for providing access of a cooling fluid to the interface between the drill crown and the earth during use of the drill. Fluid ports 23 and 25 are provided longitudinally of the drill for transmission of a fluid to aid in mud and rock cutting removal.

Figure 2:
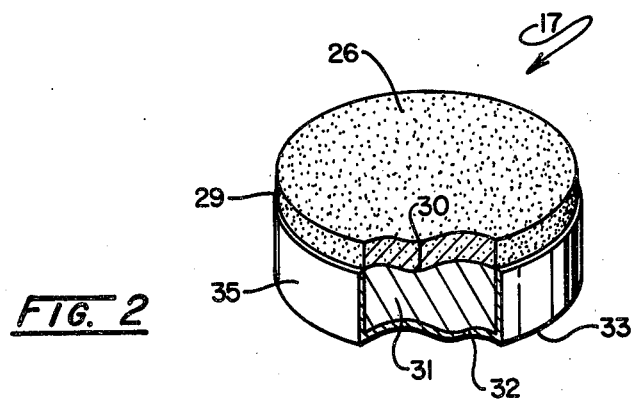
FIG. 2 is a fragmentary perspective view of a composite compact cutter for use in fabricating a drill bit of the type shown in FIGS. 1A and 1B.

FIG. 2 illustrates, in fragmentary form, one of the compact cutters 17 such as shown in FIGS. 1A and 1B as provided prior to attachment to drill crown 13. Cutter 17 is comprised of a (1) thin planar layer or mass 29, preferably, of self-bonded polycrystalline diamond, (2) substrate 31, preferably, of cemented carbide, bonded to layer 29 along an interface 30 and (3) a thin continuous layer of brazing filler metal 32 (shown in enlarged forms for purposes of illustration) coating the entire exposed surface of substrate 31 (i.e., except for the surface of substrate 31 along interface 30). Although it is preferred that layer 32 cover, in their entirety, both base surface 33 remote from interface 30 and side surface 35 of substrate 31, layer 32 may not and need not cover side surface 35 in its entirety. Compact cutter 19 is identical to compact cutters 17, except that cutters 19 comprise a 180° disc-shaped segment, rather than a 360° segment. The central cutters may also be in the shape of a rectangular parallelopiped. Also, other shape variations of cutters 17 and 19 may be used.

The drill crown 15 is molded with recesses 20 in accordance with well known prior art fabrication techniques. A preferred drill bit matrix consists of 50% tungsten carbide powder, 30% carbonyl iron powder and 20% high temperature binder. The recesses in the drill crown are formed such that a cutter bonded therein will be disposed at a rake angle, preferably between −10° and −25°, in accordance with the invention described in the aforementioned application Ser. No. 746,044 now U.S. Pat. No. 4,098,362. (Rake angle is defined as the angle or orientation of the diamond layer with respect to a line drawn perpendicular to the tangent at the point of contact between the diamond layer and the work surface.)

Figure 3A:
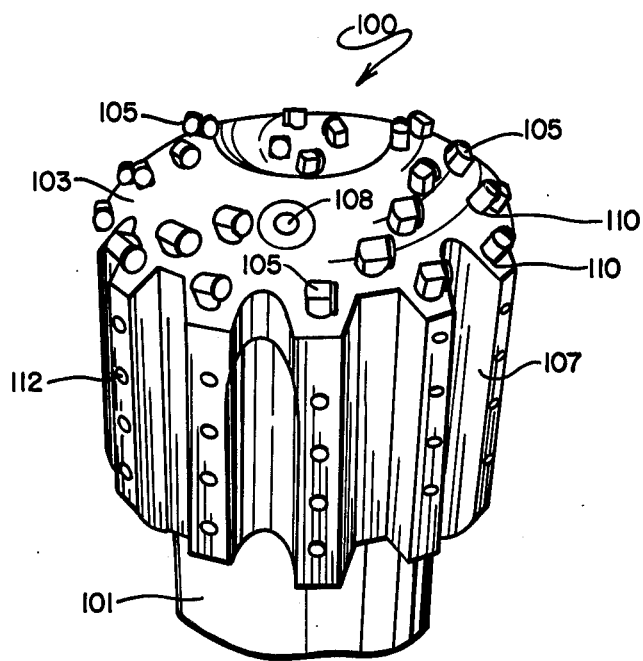
FIG. 3A is perspective view of a full hole oil and gas bit fabricated in accordance with a second embodiment of this invention.

FIG. 3A shows another embodiment of a bit fabricated in accordance with the features of this invention. In this embodiment, a drill bit 100 is comprised of an elongated shaft 101 and a drill crown 103 (e.g., of steel) in which a plurality of cutters 105 are mounted in recesses 110. A plurality of fluid courses 107 are formed in the drill crown 103 for providing access for a cooling fluid to the interface between the drill crown and the earth during drilling applications. One or more fluid ports or nozzles 108 are provided longitudinally of the drill for transmission of fluid to aid in mud and rock cutting removal. A plurality of tungsten carbide wearsurface buttons 111 are provided on the cylindrical portion of the crown 103.

Figure 3B:
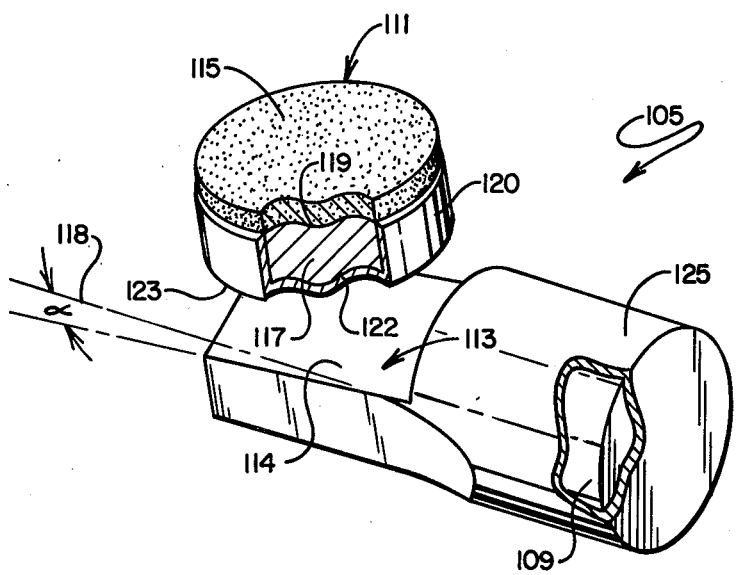
FIG. 3B is a fragmentary perspective view of the component parts prior to fabrication of a composite compact cutter for use in fabricating a bit of the type shown in FIG. 3A.

FIG. 3B shows a perspective view of the component parts, prior to fabrication, of one of the cutters 105 shown in FIG. 3A. Cutter 105 comprises an elongated pin 109 preferably of cemented carbide with a composite compact cutter blank 111 identical to cutter 17 shown in FIG. 2 which, when assembled, is mounted at one end in an inclined recess 113 formed in pin 109. Blank 111 is comprised of (1) a mass of bonded abrasive, (2) a substrate 117, preferably, of cemented carbide with a side surface 120 and a base surface 123 and (3) a thin continuous layer 122 of brazing filler material coating the entirety of base surface 123 and preferably the entirety of side surface 120 of substrate 117. A thin layer of brazing filler metal 125 is coated on the exposed surface of pin 109. If desired, layer 125 can be limited to the surface area of the pin to be inserted into recess 109. The bottom surface 114 of recess 113 is inclined at angle $\alpha$ between $-10°$ and $-25°$ with respect to a line 118 parallel to the axis of the pin 109. The purpose of this disposition is described in detail in the aforementioned application Ser. No. 746,044.

Except for application of coatings 32 and 122, compact cutters 17, 19 and cutter blank 111 are preferably constructed in accordance with the teaching of U.S. Pat. No. 3,745,623 (incorporated by reference herein).

In these compacts, as explained in detail in U.S. Pat. No. 3,745,623, the mass 29 is comprised by volume of at least 70% diamond and preferably in excess of 90% diamond. The remaining 30 or less percent is primarily comprised of the bonding material, preferably, cobalt (or alloys) of the cemented carbide substrate 31 which is infiltrated into the mass during the high temperature/high pressure fabrication process.

In an alternative embodiment of the invention, the cutters 17, 19 and cutter blank 111 may be comprised of a CBN composite compact preferably constructed, except for the application of a metal coating 32, in accordance with the teaching of U.S. Pat. No. 3,743,489 or U.S. Pat. No. 3,767,371 (incorporated by referenced herein).

Figure 4:
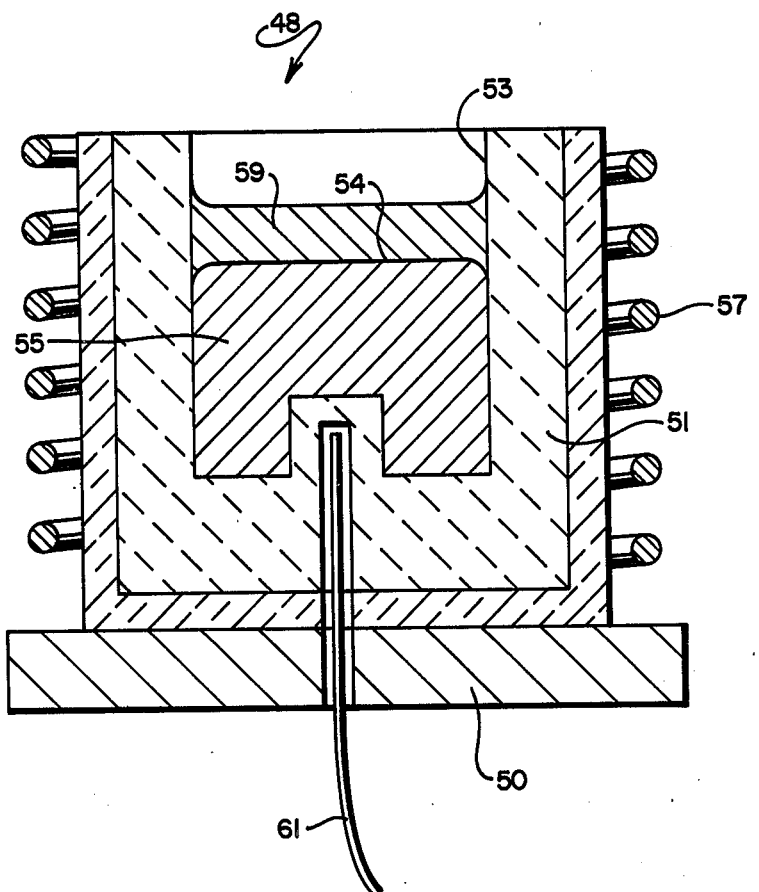
FIG. 4 is a cross-sectional view of a bath for applying a coating of brazing filler metal to a composite compact in accordance with the features of this invention.

Referring to FIG. 4, the composite compact cutters 17, 19, and cutter blank 111 and carbide pin 109, as shown in FIGS. 2 and 3B, are prepared for bit fabrication by applying a coating of brazing filler metal to a conventional composite compact by dipping each item in a molten bath 48 of the brazing filler metal. Bath 48 is comprised of a graphite base 50 and a solid high density graphite block 51 with a cavity 53. A layer of mica 52 is laminated to the sides and bottom of block 57 for electrical insulation. In block 51, a melted pool 53 of brazing filler metal is maintained at a constant temperature by induction heating via induction coils 57. The composition of the filler metal 51, which includes volatile constituents, is maintained by covering the exposed surface 54 of the pool 53 with a layer of molten flux 59. A thermocouple 61 is placed centrally of cavity 53 to continually monitor the temperature of the molten pool of filler material metal 55.

Coating of the substrate of the composite compact with the brazing filler metal is achieved by lowering or passing the compact through the molten flux layer 69 until the substrate is submerged in the molten filler metal pool 53 for a period of time between 15 and 60 sec. The immersion time is not critical except that heating of the abrasive layer to high levels is to be avoided. After the exposed surface of the substrate has been covered, the compact is removed from the bath and allowed to air cool until the filler metal layer on the substrate is solidified.

In this way a thin continuous layer of filler metal is formed on the exposed surface of the substrate of the compact. The filler metal does not wet the diamond mass and thus no coating is formed thereon even though the mass may have been submerged in the bath.

When removing the compact from the bath, a filler metal droplet may be formed on the bottom on the lower surface of the compact as it is removed. The metal layer, if desired, can be polished to reduce the thickness of the droplet and to provide a coating of more uniform thickness between 0.025 to 0.200 mm. and preferably between 0.05 and 0.10 mm. Prior to polishing the thickness of the metal layer is between about 0.025 and 0.508 mm.

A similar procedure is used to coat pins 109 except that pin 109 is fully submerged in pool 53.

The brazing filler metal is preferably a silver base alloy having a liquidus point less than 700° C. so that wetting of the substrate can be obtained at temperatures below those which would degrade the diamond layer. A preferred filler metal is BAg-1 (ASW-ASTM classification). The components of BAg-1 are 45% silver, 15% copper, 16% zinc and 24% cadmium. BAg-1 has a liquidus of approximately 618° C. and a solidus of approximately 607° C. When using BAg-1, the temperature of bath 48 is maintained between 650° and 725° C.

In alloys such as this, which contain volatile components, such as zinc and cadmium, to give the alloy its low liquidus, care must be taken to maintain the alloy composition. Flux layer 59 is provided over the molten pool 55 of filler metal to enable the molten filler metal composition to be maintained in a molten state for longer periods of time. Also the flux 59 serves to provide a final cleaning action on the surface to be coated as the surface passes through the flux 59 and into the pool 55 of filler metal.

Bonding of a cutter of the type shown in FIG. 2 is accomplished by disposing and firmly clamping, by any conventional means, the cutter in a recess in the drill crown. The bit is then placed in a preheated brazing furnace and subjected first to a heat-up cycle to bring the surface of the bit crown to a temperature between 690° C. and 700° C. as rapidly as possible without degrading the abrasive mass of the cutter and then to a soak cycle during which the temperature is maintained to permit the filler metal to infiltrate, by capillary action, the surfaces to be bonded. Following this, the bit is removed from the furnace and allowed to air cool.

Bonding of the cutters of the type shown in FIG. 3B is accomplished first by clamping a blank 111 to recess 113 at one end of pin 109 and then press fitting and clamping the other end of pin 109 in a recess 110 in the drill crown. The bit with the cutters tightly fixtured is then furnace brazed, in the same manner described above, to braze blank 111 to pin 109 and pin 109 in a drill crown recess 110.

With a cutter prepared as described above, it has been discovered that the furnace brazing cycle for providing a bond between a crown recess and the cutter can be substantially shortened.

In accordance with the preferred practice with a bit of the type shown in FIGS. 1A and 1B, weighing between about 90 and 136 kg., a heat-up cycle of 1½ to 2 hours and a soak cycle of 10 to 15 minutes have been successfully used to produce good bonding. A furnace temperature of 700° C. was used for these cycle times. The length of the heat-up and soak cycles will vary dependent upon the mass of the drill bit which acts as heat sink. However, as has been stated, it is desirable to reduce these cycles to a minimum to avoid changing the composition of the brazing filler metal by driving off volatile components and to avoid possible degradation of the abrasive mass of the cutter.

It will be recognized by those skilled in the art that in accordance with the features of the invention a composite compact having its substrate precoated with a layer of brazing filler metal has particular application to drill bit cutters. The invention would also have application in tools and implements where the high bond strength between the compact and the tool or implement support therefore is required, and where the support has a large mass thereby requiring long workpiece heat-up and soak cycles for brazing. For example, the invention may have application in areas such as cutting, abrading, wire drawing and wear surface tools and implements.

Accordingly, while the invention has been shown and described in connection with certain preferred embodiments thereof, other embodiments and modifications thereof will be apparent to those skilled in the art and it is intended that the appended claims cover all such embodiments and modifications as are within the true spirit and scope of this invention.

We claim:

1. A process of fabricating a drill bit comprising the steps of:
   (a) providing a plurality of composite compact cutters, each cutter comprising (1) a mass of polycrystalline abrasive particles of diamond or cubic boron nitride and (2) a substrate bonded to said mass;
   (b) coating the exposed surface of said substrate with a thin continuous layer of brazing filler metal;
   (c) providing a drill bit comprising a drill crown with a plurality of recesses, each recess for receiving a cutter;
   (d) positioning said cutters in said recess; and
   (e) bonding said cutters in said recesses.

2. The process of claim 1 wherein said substrate is coated with said metal by dipping in a molten bath of said metal.

3. The process of claim 2 wherein said exposed surface of said bath is covered by flux.

4. The process of claim 2 wherein said bath is maintained at a temperature between about 650° and 725° C.

5. The process of claim 2 wherein said metal has a liquidus of less than about 700° C.

6. The process of claim 5 wherein said metal is a silver base alloy.

7. The process of claim 6 wherein said metal is composed, by weight, of 45% Ag, 15% Cu, 16% Zn and 24% Cd.

8. The process of claim 1 wherein said metal has a liquidus of less than about 700° C.

9. The process of claim 8 wherein said metal is a silver base alloy.

10. The process of claim 9 wherein said metal is composed of about 45% Ag, 15% Cu, 16% Zn and 24% Cd.

11. The process of claim 1 wherein said abrasive is self-bonded, said substrate is cemented carbide and said abrasive is infiltrated with the cementing agent of said carbide substrate.

12. The process of claim 11 wherein said substrate is cobalt cemented tungsten carbide.

13. The process of claim 1 wherein said cutters are bonded at a rake angle between $-10°$ and $-25°$.

14. The process of claim 1 wherein said cutters are bonded in said recesses by heating said bit and cutters in a furnace.

15. The process of claim 14 wherein after placing the bit and cutters in said furnace, the bit is heated and brought to a temperature between about 690° and 700° C.

16. The process of claim 1 wherein said cutter further comprises a cemented carbide pin having a surface at one end for receiving said substrate and wherein said cutters are positioned by inserting the other end of said pin in said recess.

17. The process of claim 16 wherein said pin has a thin layer of brazing filler metal coating the surface of at least the other end of said pin and said cutter is bonded in said recess by heating in a furnace.

18. The process of claim 17 wherein said cutter is further positioned in said recess by fixing said substrate to said pin surface and is bonded to said surface by heating in a furnace.

19. The process of claim 18 wherein bonding between the substrate and pin surface and between said pin and said recess are simultaneously performed.

20. A composite compact comprising:
    (a) a mass comprised of bonded abrasive particles;
    (b) a substrate of cemented carbide bonded to said mass along an interface; and
    (c) a thin continuous layer of brazing filler metal coated over the entirety of the exposed surface of said substrate.

21. The compact of claim 20 wherein said metal has a liquidus of less than about 700° C.

22. The compact of claim 21 wherein said filler metal is a silver base alloy.

23. The compact of claim 22 wherein said metal is composed, by weight, of 45% Ag, 15% Cu, 16% Zn and 24% Cd.

24. Th compact of claim 20 wherein said metal layer is between 0.025 and 0.200 mm. in thickness.

25. The compact of claim 20 wherein said mass is infiltrated with the cementing agent of said substrate.

26. The compact of claim 25 wherein said substrate is cobalt cemented tungsten carbide.

27. The compact of claim 20 wherein said mass has a planar exposed surface and wherein said base surface, said interface and said mass surface are substantially coplanar.

28. A method for applying a brazing filler metal to a composite compact comprising (11) a layer of polycrystalline abrasive selected from the group consisting of diamond and CBN and (2) a substrate of cemented carbide bonded to said mass along an interface, said method comprising the steps of:
(a) providing a molten bath of said metal with the exposed surface of said bath covered by a layer of flux;
(b) passing said substrate through said flux and submerging said substrate in said molten bath;
(c) removing said compact from said bath and
(d) cooling said compact to solidify a layer of said metal on the exposed surface of said substrate.

29. The method of claim 28 wherein said mass is comprised of at least 70%, by volume, diamond.

30. The method of claim 28 wherein said cemented carbide is tungsten carbide and the cementing material for said cemented carbide is cobalt.

31. The method of claim 28 wherein the surface of said substrate is exposed except for said interface.

32. The method of claim 28 wherein said abrasive is self-bonded and is infiltrated with the cementing material of said substrate.

33. The method of claim 28 wherein said substrate is submerged for at least 15 sec.

34. The method of claim 28 wherein said metal has a liquidus of less than about 700° C.

35. The process of claim 28 wherein said metal is a silver base alloy.

36. The method of claim 35 wherein said metal is composed, by weight, of about 45% Ag, 15% Cu, 16% Zn and 24% Cd.

37. The method of claim 28 wherein said bath is maintained at a temperature between about 650° and 725° C.

38. A method of fabricating an implement comprising the steps of:
(a) providing a composite compact comprising (1) a mass of polycrystalline abrasive selected from the group consisting of diamond and CBN, (2) a cemented carbide substrate bonded to said mass along an interface, and (3) a thin layer of brazing filler metal coating the entirety of the exposed surface of said substrate;
(b) providing an implement comprising a support with a surface for mounting said compact;
(c) positioning said compact in contact with said surface; and
(d) brazing said compact to said surface.

39. The process of claim 38 wherein said substrate is coated with said metal by dipping in a molten bath of said metal.

40. The process of claim 39 wherein said exposed surface of said bath is covered by flux.

41. The process of claim 40 wherein said bath is maintained at a temperature between about 650° and 725° C.

42. The process of claim 38 wherein said metal has a liquidus of less than about 700° C.

43. The process of claim 42 wherein said metal is a silver base alloy.

44. The process of claim 43 wherein said metal is composed, by weight, of 45% Ag, 15% Cu, 16% Zn and 24% Cd.

45. The process of claim 38 wherein said compact is brazed to said surface by heating said support and compact in a furnace.

46. The method of claim 38 wherein said abrasive is self-bonded and is infiltrated with the cementing material of said substrate.

47. The method of claim 46 wherein said substrate is cobalt cemented tungsten carbide.

48. A composite compact cutter comprising:
(a) a mass comprised of bonded abrasive particles;
(b) a substrate of cemented carbide bonded to said means along an interface;
(c) a thin continuous layer of brazing filler metal coated over the entirety of the exposed surface of said substrate and
(d) a cemented carbide pin having a surface at one end thereof, said exposed surface of said substrate being brazed to said pin surface.

49. The cutter of claim 48 wherein said pin has a thin layer of brazing filler metal coating the surface of at least the other end of said pin.

50. The compact of claim 49 wherein said metal has a liquidus of less than about 700° C.

51. The compact of claim 50 wherein said filler metal is a silver base alloy.

52. The compact of claim 51 wherein said metal is composed, by weight, of 45% Ag, 15% Cu, 16% Zn and 24% Cd.

53. The compact of claim 49 wherein said metal layers are between 0.025 and 0.200 mm. in thickness.

54. The compact of claim 49 wherein said mass is infiltrated with the cementing agent of said substrate.

55. The component of claim 54 wherein said substrate is cobalt cemented tungsten carbide.

* * * * *